United States Patent [19]

Takahashi et al.

[11] Patent Number: 5,213,277
[45] Date of Patent: May 25, 1993

[54] SELF-ADVANCING FILM CASSETTE HAVING SEPARATION CLAW FOR JAMMING PREVENTION

[75] Inventors: Koichi Takahashi; Kuniharu Kitagawa; Hideaki Kataoka; Tomoyuki Takahashi, all of Kanagawa, Japan

[73] Assignee: Fuji Photo Film Co., Ltd., Kanagawa, Japan

[21] Appl. No.: 869,876

[22] Filed: Apr. 17, 1992

Related U.S. Application Data

[63] Continuation of Ser. No. 607,417, Oct. 31, 1990, abandoned.

[30] Foreign Application Priority Data

Nov. 2, 1989 [JP] Japan ................. 1-286725
Nov. 13, 1989 [JP] Japan ................. 1-294435
Feb. 23, 1990 [JP] Japan ................. 2-43736

[51] Int. Cl.⁵ .............................. G03B 17/26
[52] U.S. Cl. ........................... 242/71.1; 354/275
[58] Field of Search .......... 242/71, 71.1, 71.7, 242/195; 354/275

[56] References Cited

U.S. PATENT DOCUMENTS

| | | | |
|---|---|---|---|
| 1,519,536 | 12/1924 | Furry | 206/59 |
| 2,176,507 | 10/1939 | Nagel | 242/71.1 |
| 2,336,278 | 12/1943 | Mihalyi | 242/71 |
| 2,360,255 | 10/1944 | Mihalyi | 242/71 |
| 2,364,381 | 12/1944 | Mihalyi | 242/71 |
| 2,521,932 | 9/1950 | Mihalyi | 242/71.1 |
| 2,521,935 | 9/1950 | Monroe | 1/2 |
| 2,552,200 | 5/1951 | Mihalyi | 242/71 |
| 3,323,744 | 6/1967 | Chesley et al. | 242/71.1 |
| 3,467,340 | 9/1969 | Rosenburgh | 242/197 |
| 3,556,435 | 1/1971 | Wangerin | 242/195 |
| 3,627,229 | 12/1971 | Wangerin | 242/195 |
| 3,627,230 | 12/1971 | Wangerin | 242/195 |
| 3,677,499 | 7/1972 | Wangerin | 242/195 |
| 3,771,687 | 11/1973 | Krtous | 242/71.1 |
| 3,797,777 | 3/1974 | Hosono et al. | 242/195 |
| 4,138,068 | 2/1979 | Kinoshita | 242/71.1 |
| 4,407,579 | 10/1983 | Huff | 242/71.1 |
| 4,455,076 | 6/1984 | Birkeland | 242/71.1 |
| 4,832,275 | 5/1989 | Robertson | 242/71.1 |
| 4,834,306 | 5/1989 | Robertson et al. | 242/71.1 |
| 4,846,418 | 7/1989 | Fairman | 242/71.1 |
| 4,887,776 | 12/1989 | Niedospial, Jr. et al. | 242/71.1 |
| 4,948,063 | 8/1990 | Niedospial, Jr. | 242/71.1 |
| 4,962,401 | 10/1990 | Takahashi | 242/71.1 |
| 5,003,334 | 3/1991 | Pagano et al. | 354/275 |

FOREIGN PATENT DOCUMENTS 2921379 11/1980 Fed. Rep. of Germany.
926241 12/1947 France.
2078703 11/1971 France.

OTHER PUBLICATIONS

Patent Abstracts of Japan, vol. 6, No. 203 (P-148)(1081), Oct. 14, 1982, JP-A-57-109933.

*Primary Examiner*—Daniel P. Stodola
*Assistant Examiner*—John Q. Nguyen
*Attorney, Agent, or Firm*—Sughrue, Mion, Zinn, Macpeak & Seas

[57] ABSTRACT

A self-advancing film cassette has at least one separation claw for separating a film leader from a roll of film. This separation claw is disposed within a cassette shell so that it will contact an outermost peripheral surface of a photographic film on the outer side of an area where a picture frame is to be formed. The separation claw is so configured that the contact position between the tip thereof and an end face of a film leader end is ⅓ or more of the film thickness when measured from the outer surface of the photographic film. The film leader projects most at a portion corresponding to the separation claw, and the film leader is formed to be narrow so that it will not be stuck to the film roll. In one embodiment, the film leader is subjected to deformation treatment to form a corrugated leading portion, or to rigidity increasing treatment to form a more rigid leading portion.

7 Claims, 12 Drawing Sheets

SELF-ADVANCING FILM CASSETTE HAVING SEPARATION CLAW FOR JAMMING PREVENTION

This is a continuation of application No. 07/607,417 filed Oct. 31, 1990, now abandoned.

BACKGROUND OF THE INVENTION

The present invention relates to a self-advancing film cassette for advancing the leader of a photographic film strip in accordance with rotation of a spool, and more particularly to an improved self-advancing film cassette which is capable of separating the film leader from a film roll wound on a spool with high reliability.

Presently, a film cassette containing a roll of photographic film strip of 135 type (35 mm in width) is used most widely. This film cassette is constituted by a light tight cylindrical cassette shell provided with a film passage mouth, a spool rotatably contained in the cassette shell, and a film roll coiled on the spool. The film leader protrudes from the film passage mouth. When loading the film cassette into a camera, the film leader is brought into engagement with a threading member of the camera. By driving the threading member, the film is pulled out from the cassette shell and fed to a film take-up chamber so as to be wound onto a take-up spool in this chamber.

In recent years, in order to meet a demand for making the film cassette compact and easy to handle, a self-advancing film cassette has been proposed in which the entire film is contained in the cassette shell and the film leader is advanced from the film passage mouth in accordance with rotation of the spool. FIG. 25 shows a schematic view of a self-advancing film cassette described in U.S. Pat. No. 4,832,275. A spool 2 rotatably contained in a cassette shell (not shown) has a film 1 wound on its outer periphery to form a film roll 3. Further, the film roll 3 has a pair of restriction rings 5 and 6 fitted to the outermost peripheral surface thereof out of the vertical relative to the film roll 3 in order to restrict the loosening of the film roll 3. The distance between the pair of restriction rings 5 and 6 is large in the vicinity of a film port 9 provided with a film passage mouth (not shown). so that a film leader end 1a can pass therethrough. These restriction rings 5 and 6 are engaged in slant grooves formed in the inner wall of the cassette shell. Also, a pair of separation claws 7 and 8 are provided integrally on the film port 9 so as to contact the outermost peripheral surface of the film roll 3.

When the spool 2 is rotated in the unwinding direction, the film roll 3 is loosened a little if there is a tiny gap between the restriction rings 5 and 6 and the outermost peripheral surface of the film roll 3. However, the loosening of the wound film is restricted immediately by the restriction rings 5 and 6, and the film roll 3 and the restriction rings 5 and 6 are rotated together with the spool 2 thereafter. When the film leader end 1a reaches a position close to the film port 9, it is separated from the film roll 3 by the separation claws 7 and 8, and the film leader end 1a is advanced outside the cassette shell through the film passage mouth.

A self-advancing film cassette described in U.S. Pat. No. 4,834,306 is constructed such that ring-shaped rims are provided on the peripheral edges of a pair of flanges disposed on a spool. The rims receive the side edge of the outermost periphery of the film roll so as to prevent loosening of the film. Further, a pair of triangular separation claws are disposed to the film port such that the front ends thereof are engageable with the film leader end, and the side edges thereof push the pair of flanges outwardly to relieve the film from the restriction of the rims, so that the film leader end separated from the film roll is guided to the film passage mouth.

In general, the film leader frequently is stuck to a film portion thereunder for a number of reasons. For example, the film curls after being stored for a long time in the cassette. Also, the film may be withdrawn from the cassette under conditions of high temperature and high humidity or static electric charge. Further, withdrawal of the film from the cassette may be difficult because of difficulties during transportation of the cassette. In such case, in the aforementioned conventional self-advancing film cassette, it becomes impossible to separate the film leader surely from the film roll to advance the film from the film passage mouth. Also, it happens sometimes that only one of the separation claws separates the film leader, but the other fails to do so. In that case, as the film leader clogs the film passage mouth, if the spool keeps rotating, the film jams within the cassette shell.

SUMMARY OF THE INVENTION

Therefore, it is an object of the present invention to provide a self-advancing film cassette which is capable of not only separating a film leader from a roll of film with high reliability when the film leader is stuck to the roll of film, but also advancing the same outside the cassette.

Another object of the present invention is to provide a self-advancing film cassette which is constructed such that a film leader is not stuck to a roll of film.

A further object of the present invention is to provide a self-advancing film cassette which is constructed such that film jamming does not occur.

To achieve the above and other objects and advantages, the inventive self-advancing film cassette includes a separation claw adapted to separate a film leader. According to a preferred embodiment, this separation claw is formed on a front end of a guide projection adapted to guide a film into a film passage mouth. This separation claw preferably is disposed away from an area in which an exposure image is formed so as not to damage the area, as a position on the passageway of a perforation or a position near thereto. Further, a contact position between the separation claw and a face of a film leader end preferably is $\frac{1}{3}$ or more of the thickness of the film when measured from the outer surface of the roll of film. Also, a groove preferably is formed in a part of the separation claw so that the separation claw is given a spring property for movement in the radial direction of the roll of film.

According to a further preferred embodiment of the present invention, the self-advancing film cassette includes a pair of ring-shaped ridges positioned to face the perforation. These ridges are adapted to urge the roll of film in order to prevent the film from being loosened. The separation claw is disposed in connection to these ridges. A portion of the roll of film opposite the separation claw projects in the longitudinal direction of the film so that separation of the film leader from the roll of film starts at that portion.

In a preferred embodiment of the present invention, in order to prevent the film leader from being stuck to the roll of film, a portion of the film leader end is narrow in film width. Also, the film leader is deformed into a corrugation, etc., or a hardening agent is applied to the film leader to increase rigidity thereof, in order to prevent sticking.

According to the present invention, since one separation claw is used, generation of jamming of the film can be prevented with high reliability. Also, by applying an appropriate treatment to the film leader, the film leader can be prevented from being stuck to the roll of film.

BRIEF DESCRIPTION OF THE DRAWINGS

The above objects and advantages will be understood readily by those skilled in the art from the following detailed description of the invention with reference to the accompanying drawings, in which.

DETAILED DESCRIPTION OF THE PREFERRED EMBODIMENTS

Figure 1:
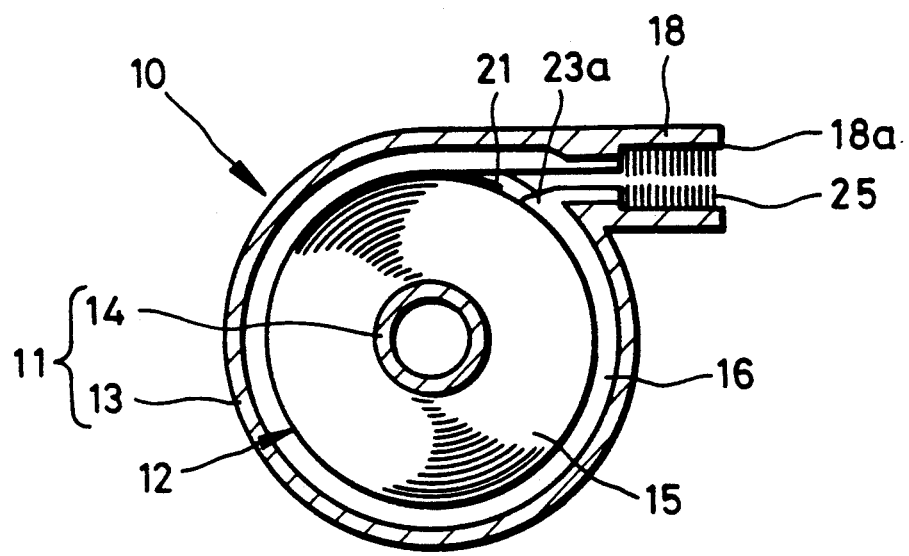
FIG. 1 is a side sectional view of a film cassette of the present invention, in which the separation claw has an improved configuration to attain separation of the film leader.

In FIG. 1, a film cassette 10 is formed of a light-tight cassette 11, and a roll of film 12 contained therein. The cassette 11 is formed of a plastic cassette shell 13 having a light prohibiting property, and a plastic spool 14 rotatably contained therein. The film 15 in the roll of film 12, for example, is 135 type film, wound on the outer periphery of the spool 14, and is disposed between a pair of flanges (see FIG. 2). a trailing end of the film 15 being fixed to the spool 14. Actually, the cassette shell 13 is constituted by a pair of separately formed shell halves which are spliced integrally after the spool 14 having the roll of film 12 has been loaded therein.

The cassette shell 13 is provided with ring-like ridges 16 and 17 formed integrally along the inner wall thereof, the ridges 16 and 17 being adapted to abut the outermost peripheral surface of the roll of film 12 to prevent the roll of film 12 from being loosened. Also, the cassette shell 13 is provided with a port portion 18 having a film passage mouth 18a. A passage leading to the interior of the cassette shell 13 from the film passage mouth 18a is provided with a pair of guide projections 23 and 24 adapted to separate an end 21 of a film leader 20 from the roll of film 12. The projections 23 and 24 are disposed so as to be connected to the ridges 16 and 17. Plush 25 for trapping light directed into the cassette 11 is mounted on the film passage mouth 18a.

Figure 2:
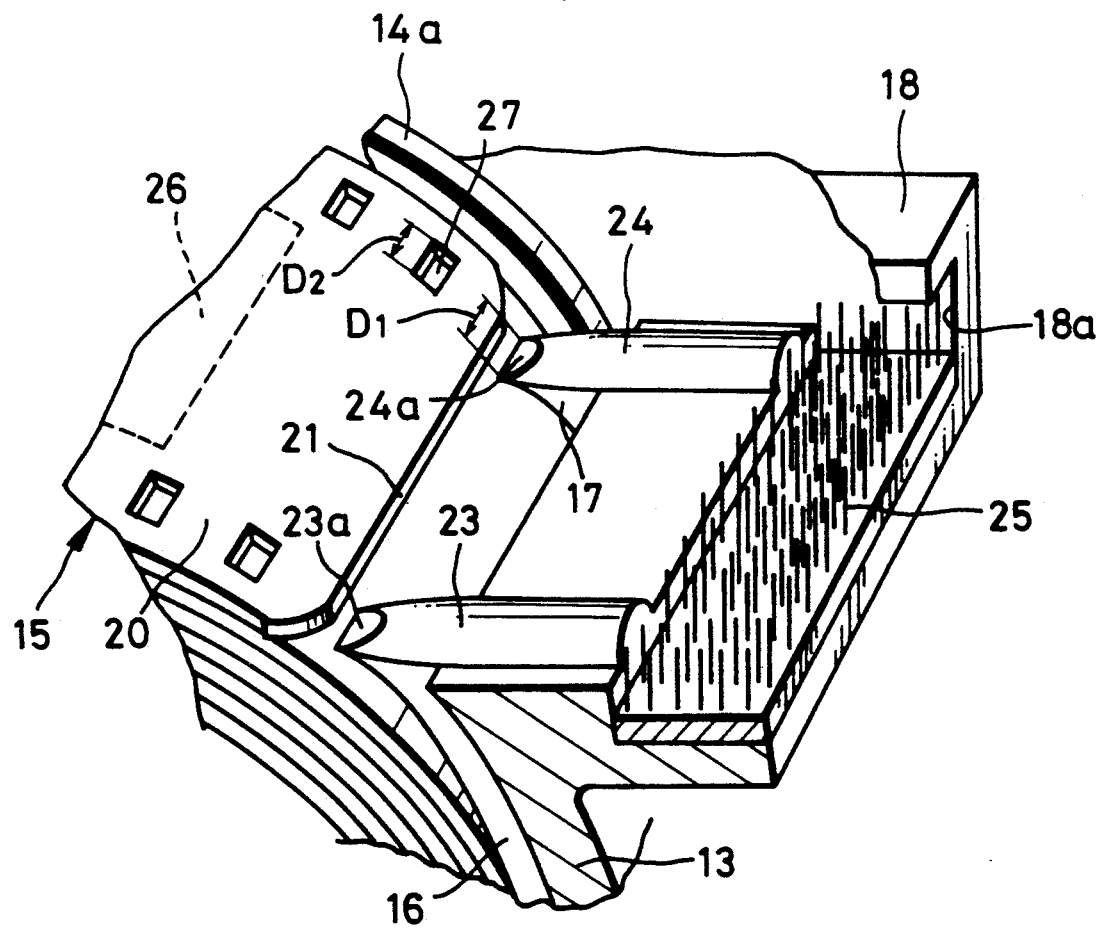
FIG. 2 is a perspective view showing the construction of an important portion of the embodiment of FIG. 1.

As shown in FIG. 2, a pair of separation claws 23a and 24a are formed integrally on the tips of the guide projections 23 and 24. The separation claws 23a and 24a are disposed away from the frame area of the film 15, for example, in such a manner as to face perforations 27 in order not to damage an exposure image 26 to be formed. The widths $D_1$ of the separation claws 23a and 24a are greater than the widths $D_2$ of the perforations 27 so that the separation claws 23a and 24a will not enter the perforations 27.

Figure 3:
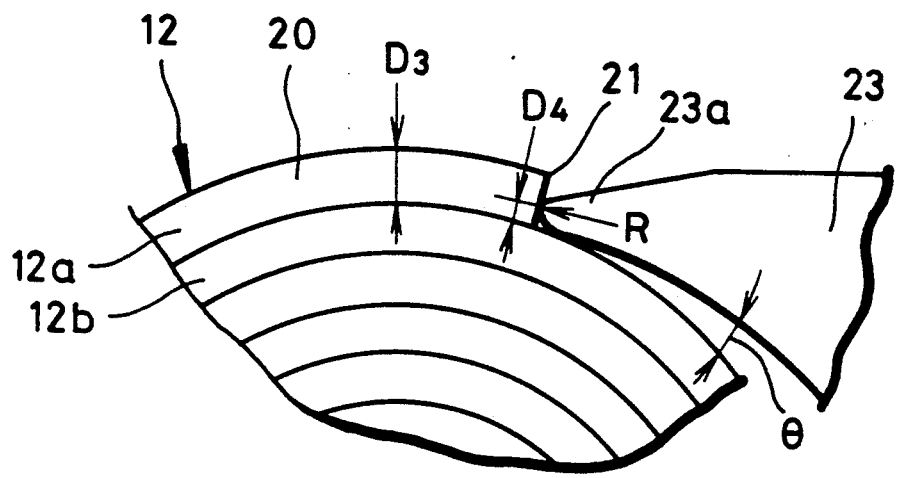
FIG. 3 is an explanatory view showing the contacting state between the separation claw and the face of the film leader end.

As shown in FIG. 3, in order to have the separation claws 23a and 24a abut surely against the film leader end 21, the radii of curvature R of the separation claws 23a and 24a are set in a range from 0.02 mm to 0.5 mm, and preferably from 0.04 mm to a half of the thickness $D_3$ of the film 15. Also, it is desired that the distance $D_4$ from the position where the separation claws 23a and 24a are abutted against the end face of the film leader end 21 to the outer surface of a second layer 12b on the inner side of outermost peripheral layer 12a be ⅔ or less, preferably ½ or less, of the film thickness $D_3$. Also, it is desired that the angles θ formed between the separation claws 23a and 24a and the second layer 12b be in a range from 0 to 30 degrees, preferably 0 degrees. Further, the separation claws 23a and 24a are made smooth so as not to damage the surface of the film 15. In addition, the smooth surfaces of the separation claws 23a and 24a are hard chrome-plated. Also in order to help the film leader end 21 climb easily over the upper surfaces of the separation claws 23a and 24a after the film leader end 21 has been separated from the second layer 12b. the upper surfaces of the separation claws 23a and 24a are finished into inclined planar surfaces.

When a film cassette 10, constructed as just described, is loaded into a camera (not shown). the spool 14 is connected to a spool driving shaft (not shown). When film loading is complete, the spool driving shaft is rotated to rotate the spool 14 in the unwinding direction. At that time, although the roll of film 12 tends to get loosened, rotation of the spool 14 is transmitted up to the film leader 20, as the edge portions of both sides of the outermost peripheral surface are restricted by the ring-like ridges 16 and 17. As a result the spool 14 is rotated together with the roll of film 12.

While the spool 14 is being rotated together with the roll of film 12, the front of the film leader end 21 is brought into contact with the separation claws 23a and 24a, as shown in FIG. 3. When the spool 14 is further rotated from that state, the second layer 12b and lower film layers are rotated, but the film leader 20 forming the first layer 12a climbs over the planar upper portions of the guide projections 23 and 24 in order to enter the film passageway. Further, the film leader 20 is moved outside the cassette 11, passing through the film passage mouth 18a, and then is advanced into the film take-up chamber, and wound about the film take-up spool. When the spool 14 is rotated in the winding direction after recording images on all of the frames, the exposed film 15 is wound about the spool 14. At this time the film leader end 21 is drawn back entirely into the cassette shell 13.

The first layer 12a sometimes sticks to the second layer 12b owing to a curling habit of the film itself, or to high temperature, high humidity, etc. Even in such a case, the separation claws 23a and 24a are capable of separating the first layer 12a from the second layer 12b with high reliability. That is, the first layer 12a is made free from the second layer 12b at a portion apart from the film leader end 21 when the separation claws 23a and 24a abut the front of the film leader end 21. However, as the separation claws 23a and 24a abut the film at a portion ⅓ or more from the outer surface of the film when measured, the front of the film leader end 21 is slid up along the separation claws 23a and 24a and passed over the guide projections 23 and 24. Accordingly the film leader end 21 never slides downwardly along the separation claws 23a and 24a and catches under the guide projections 23 and 24.

Figure 4:
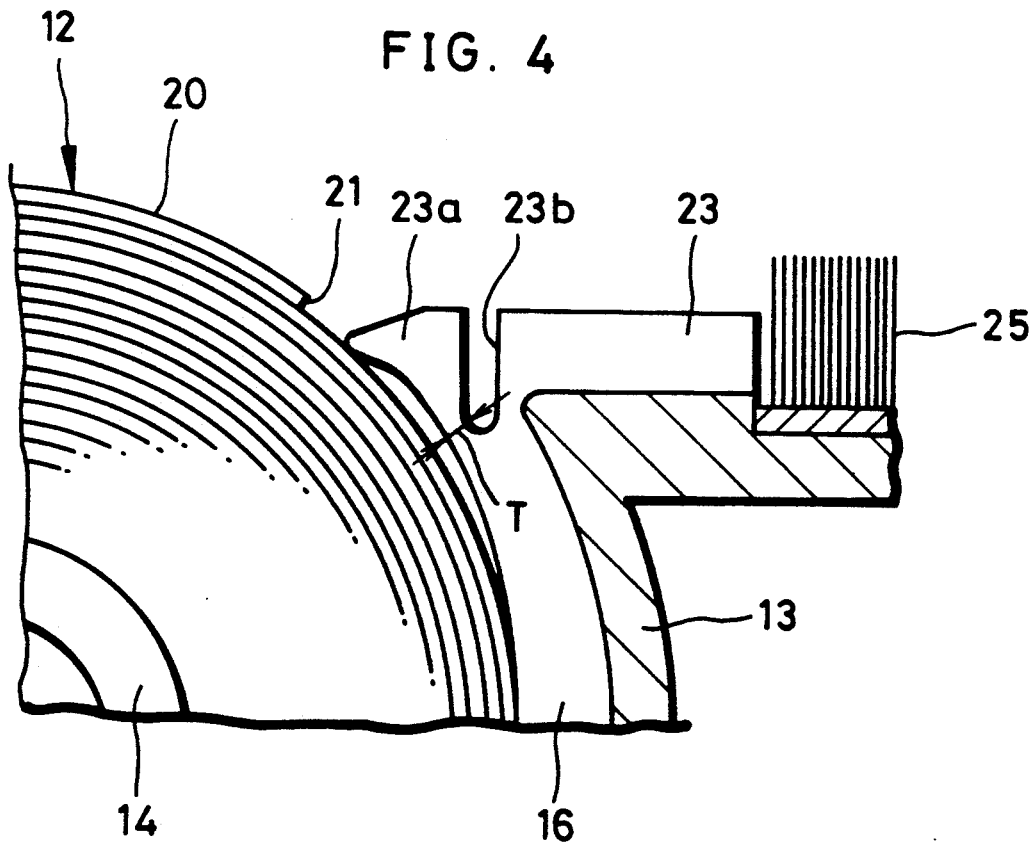
FIG. 4 is a sectional view of an important portion showing one embodiment of the present invention in which a groove is formed in the base portion of the separation claw.

FIG. 4 shows another embodiment of the guide projection, members similar to those in the embodiment of FIGS. 1 through 3 being denoted by like reference numerals. In this embodiment, a groove 23b extending up to a ridge 16 is formed in order to give a spring property to a separation claw 23a of the guide projection 23. The thickness T between the bottom of this groove 23b and the surface of the ridge 16 preferably is 1.0 mm or less.

Since the separation claw 23a is movable in the radial direction of a spool 14 by use of the groove 23b, the separation claw 23a can be brought into contact with the surface of the roll of film 12 without fail, to advance the film leader 20. Owing to the foregoing arrangement, the film leader 20 can be separated with high reliability even when the roll of film 12 is in the sticking state, and the separation claw 23a never contacts the outermost peripheral surface of the roll of film 12 very hard so as to damage the film 15. Also, it is preferable that the width of the groove 23b be made small so that the film leader end 21 will not fall into the groove 23b. Alternatively, an edge of the opening defined by the groove 23b in the vicinity of the film passage mouth 18a should be cut at an angle so that it will escape easily from the groove 23b. The other separation claw 24a has the same construction as the claw 23a.

Besides the method for modifying the configurations of the separation claws 23a and 24a into special forms in order to separate the film leader 20 from the roll of film 12 with high reliability, there is another method to attain the same purpose, wherein the film leader 20 is constructed so as to stick only with difficulty to the roll 12 of film. Naturally, the employment of these two approaches together will be even more beneficial.

Figure 5:
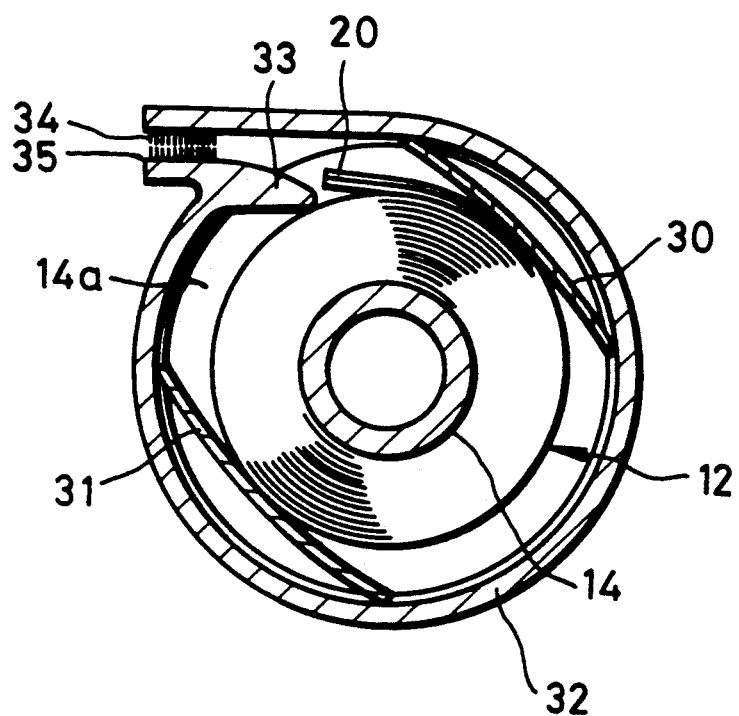
FIG. 5 is a sectional view showing a film cassette of the present invention, in which the film leader is deformed into a corrugation.
Figure 6:
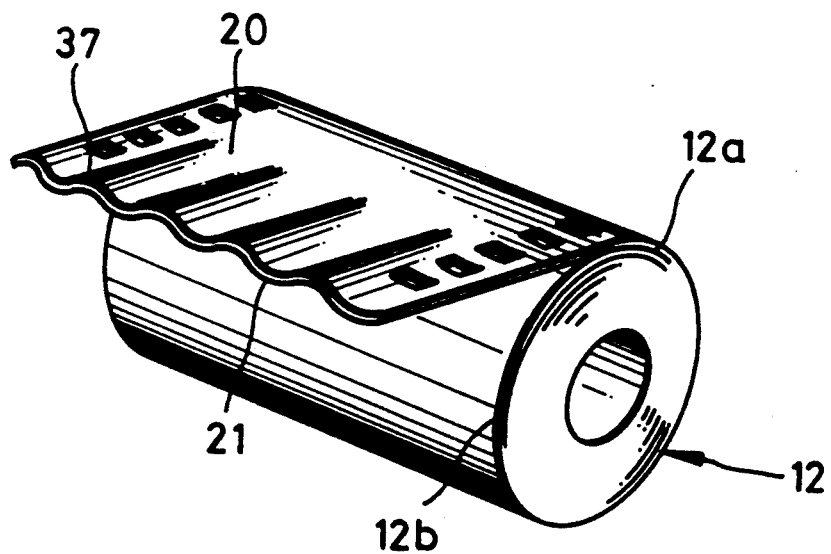
FIG. 6 is a perspective view of the roll of film shown in FIG. 5.

FIGS. 5 and 6 show one embodiment in which a corrugating treatment is applied to the film leader, members similar to those of the aforementioned embodiment being denoted by like reference numerals. In this embodiment, two pairs of metal or plastic elongated resilient plates are used instead of the ridges 16 and 17. By urging the outer periphery of the roll of film 12 with these resilient plates, the roll of film 12 is prevented from being loosened. FIG. 5 depicts only one pair of resilient plates 30 and 31, in which both ends of the resilient plates 30 and 31 are fixed to the inner wall of the cassette shell 32, respectively. These resilient plates 30 and 31 have lubricant applied to their surfaces which contact the roll of film 12 to reduce friction generated between those surfaces and the roll of film 12. The separation claws 33 for separating the film leader end 21 are provided one to each side of the inner wall of the cassette shell 32. In order not to damage the roll of film 12, the separation claw 33 is made comparatively large in radius of curvature and with a smooth surface. The reference numeral 34 denotes plush, and 35, a film passage mouth.

As shown in detail in FIG. 6, a plurality of corrugated deformations 37 are formed extending in the longitudinal direction of the film from the film leader end 21 so that the first layer 12a will not be stuck to the second layer 12b. Creating a deformation 37 as a corrugation can be obtained easily, for example, by clamping the film leader 20 from both sides with a corrugating metal press, and pressurizing and heating the same. Also, the size of the corrugated deformation 37 in the direction of thickness thereof is large enough for the film leader end 21 to pass easily through the film passage mouth.

In this embodiment since the roll of film 12 is urged with the two pairs of resilient plates 30, 31, the roll of film 12 is rotated together with the spool 14 when the spool 14 is rotated in the unwinding direction. Since the corrugated deformation 37 is formed on the film leader 20, the film leader end 21 is not stuck to the second layer 12b. As a result, the film leader end 21 is separated easily from the roll of film 12 by the separation claw 33 and is not advanced outside the cassette shell 32.

Figure 7:
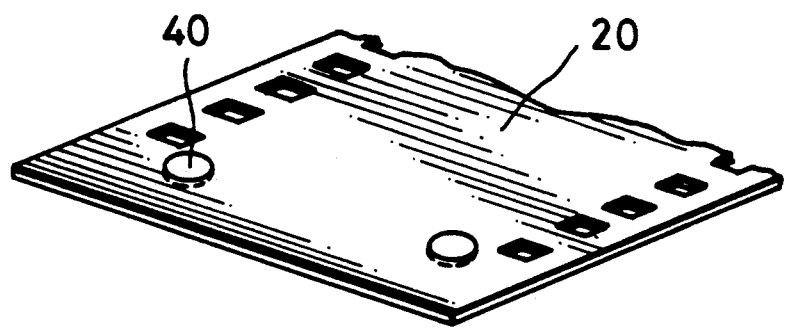
FIGS. 7 through 10 are perspective views respectively showing the embodiments of the present invention, in which the film leaders are deformed.
Figure 8:
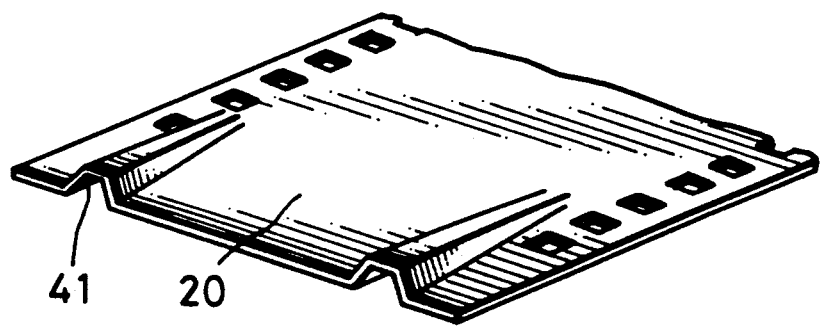
Figure 9:
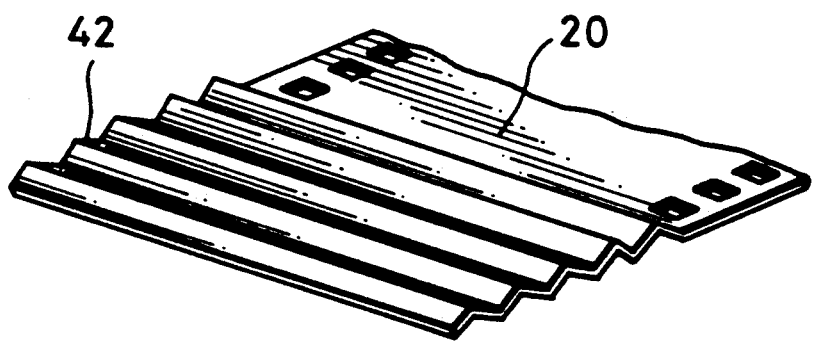
Figure 10:
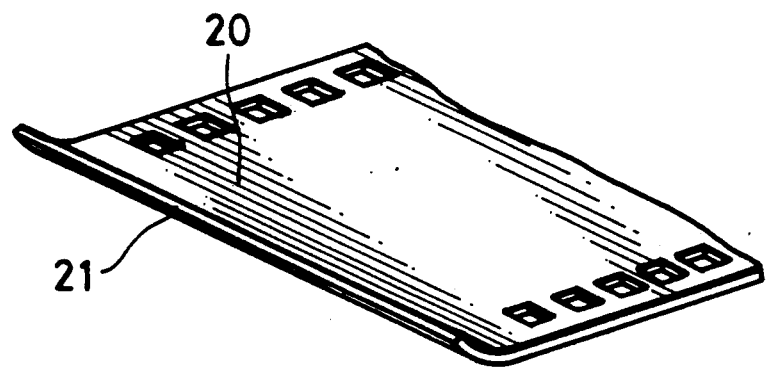
Figure 11:
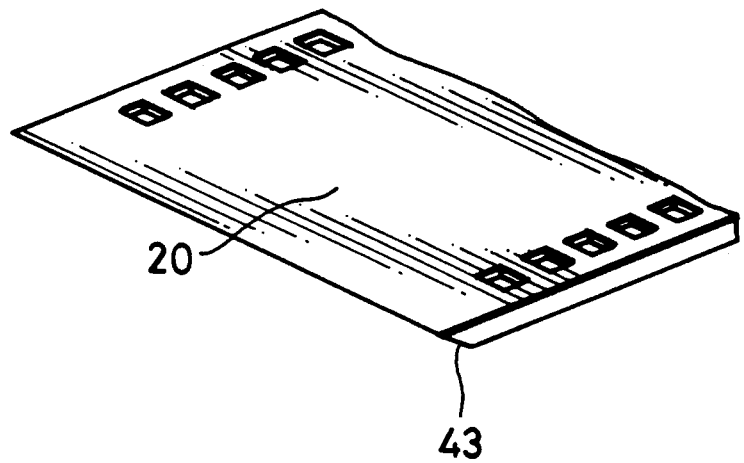
FIG. 11 is a perspective view showing one embodiment of the present invention, in which the film leader end is cut with a bias.
Figure 12:
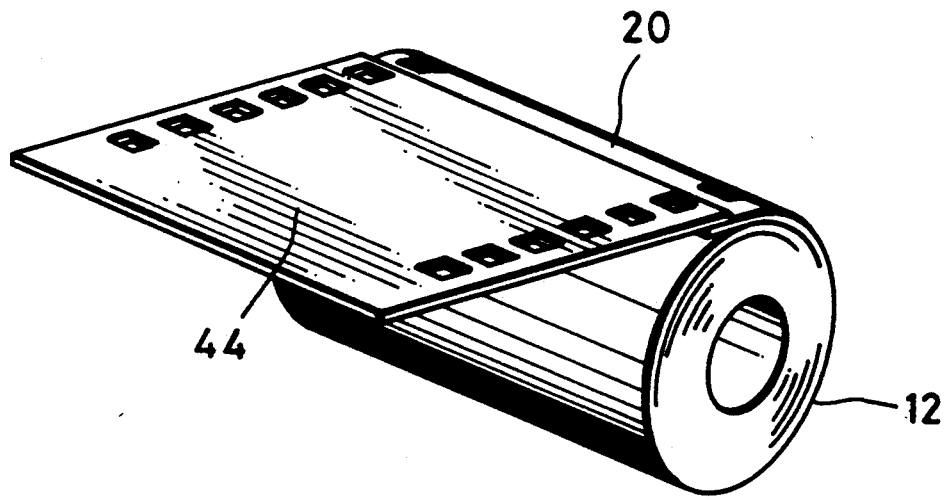
FIGS. 12 through 15 are perspective views respectively showing the embodiments of the present invention, in which the film leader has an increased rigidity.

To prevent the film leader end 21 from being stuck to the roll of film 12, there are other ways of deformation besides the corrugated deformation, such as by providing a small projection 40 as shown in FIG. 7, a wedge form 41 as shown in FIG. 8, and a zig-zag form 42 as shown in FIG. 9, all being formed by embossing. Also, as shown in FIG. 10, the film leader end 21 may be curved or bent in a direction away from the roll of film 12. It also is effective to cut the surface of the film leader end diagonally to form a bias cut portion 43 where an upper surface projects, as shown in FIG. 11. In the embodiment shown in FIG. 12, a leader member 44 having a higher rigidity than that of the film leader 20 is spliced to the film leader 20. As this leader member 44 is very straight and is difficult to maintain in curled form, the leader member 44 will not stick to the roll of film 12.

Figure 13:
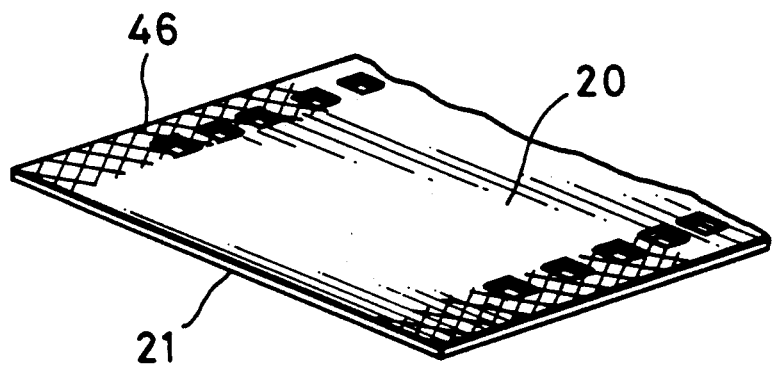
Figure 14:
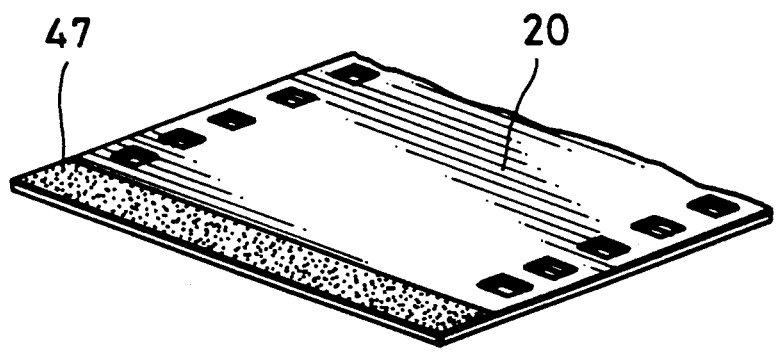
Figure 15:
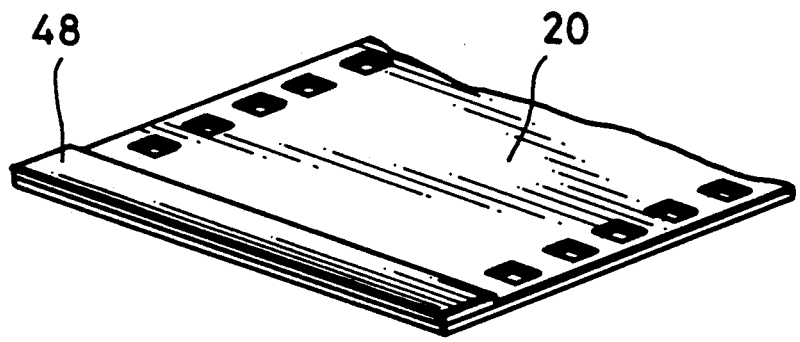

In the embodiment shown in FIG. 13, a knurling 46 is each applied to both edge portions of the film leader 20 in order to prevent the film leader 20 from being stuck to the roll of film 12. FIG. 14 depicts another embodiment in which the film leader 20 is hardened by heating, or a hardened portion 47 is formed on the film leader 20 by applying resin, etc. In another embodiment illustrated in FIG. 15, a strip-shaped reinforcing member 48 is spliced to the film leader 20. It is more effective if a bias cut similar to that shown in FIG. 11 is applied to the tip portion in the embodiments shown in FIGS. 13 through 15.

Figure 16:
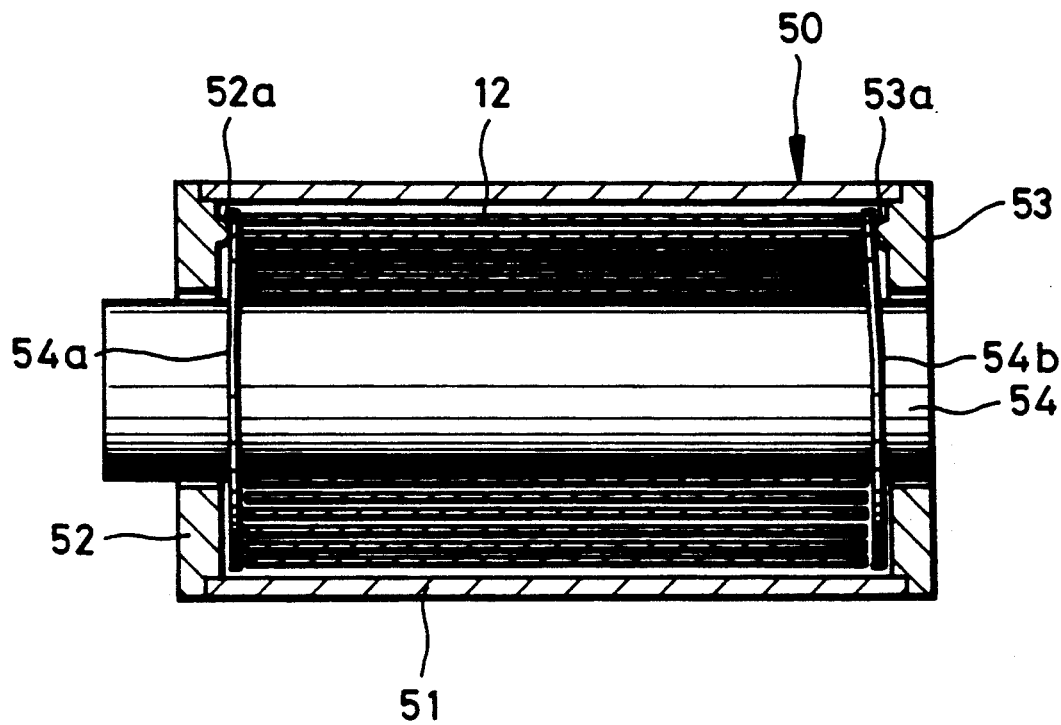
FIG. 16 is a side sectional view of a film cassette of the present invention, in which the roll of film is nipped with the flange of the spool in order to prevent the roll of film from being loosened.

FIG. 16 shows another embodiment in which the roll of film is prevented from being loosened by nipping the roll of film between flanges of a spool. A cassette shell 50 is constituted by a cylinder 51 provided with a film passage mouth (not shown), a pair of side plates 52, 53, mounted in light-tight fashion on both sides of the cylinder 51, and a spool 54 rotatably supported by the pair of side plates 52, 53. Ring-like ridges 52a and 53a are formed on the inner surface of the side plates 52 and 53, but at a position away from the film passage mouth. In the case shown in FIG. 16 upper portions of the flanges 54a and 54b are deformed inwardly by the pair of ridges 52a and 53b so as to nip a part of the roll of film 12. Since this roll of film 12 is nipped by the flanges 54a and 54b, the roll of film 12 is rotated together with the spool 54 to feed the film leader 20. The guide projections shown in FIGS. 1-3 are formed on the film passage mouth.

Figure 17:
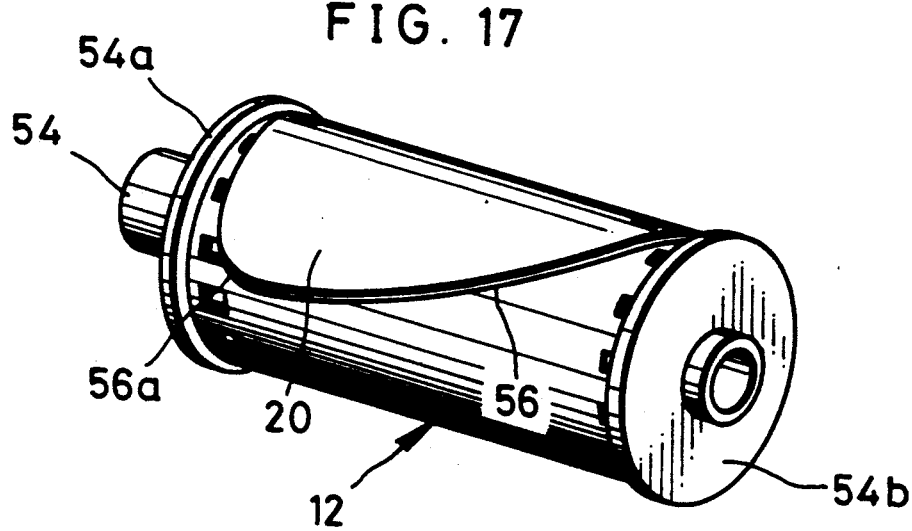
FIGS. 17 through 19 are perspective views respectively showing a film roll, in which the film leader is formed to have a narrow width.
Figure 18:
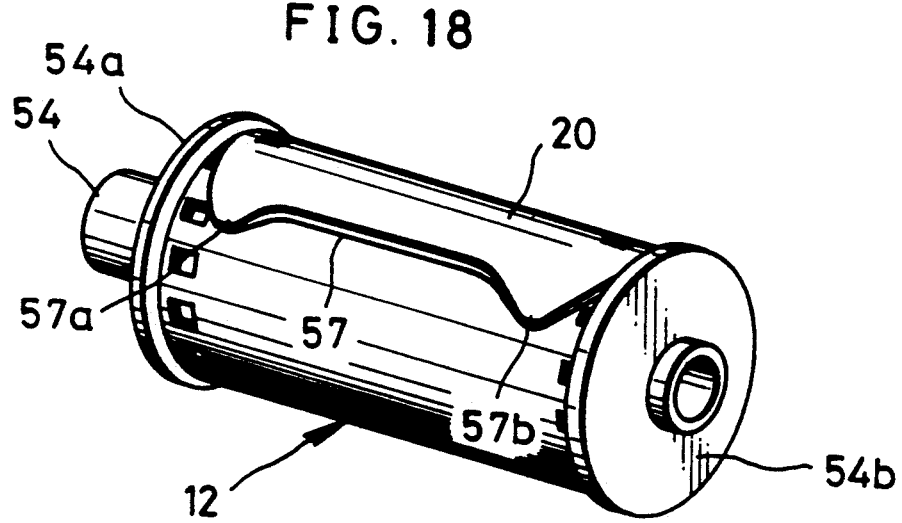
Figure 19:
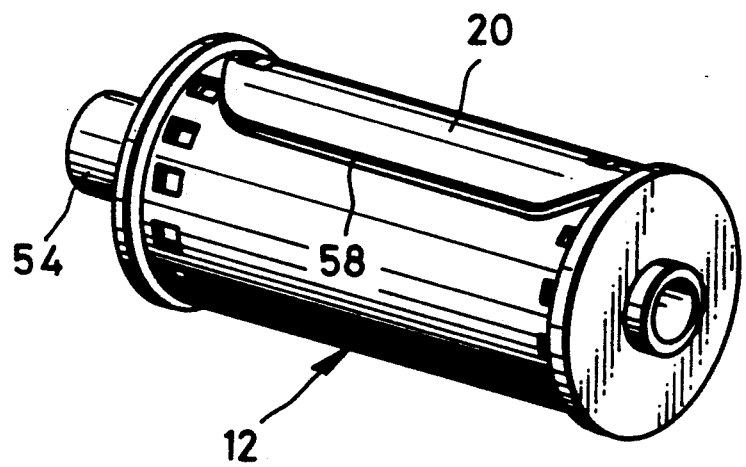
Figure 21:
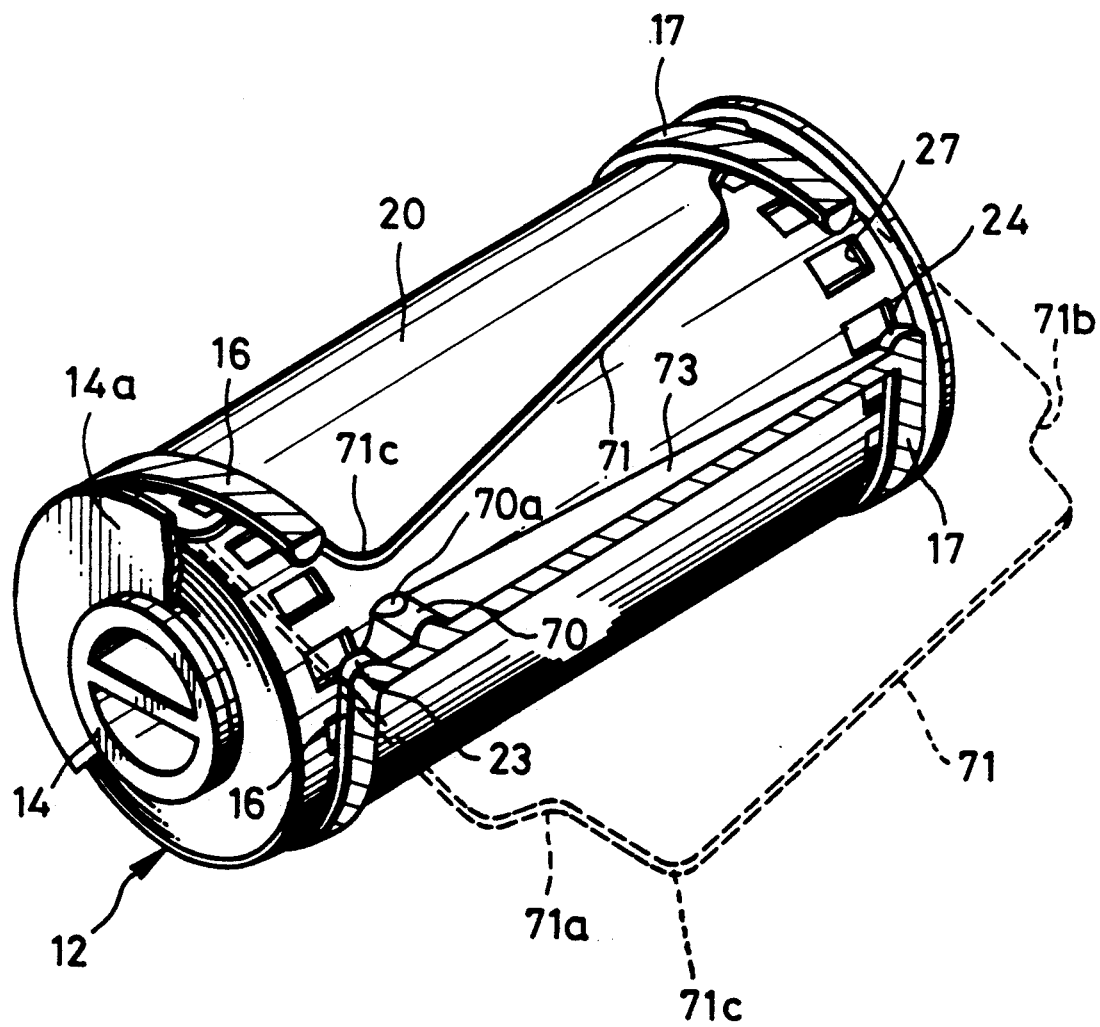
FIG. 21 is a perspective view showing the inner construction of a film cassette of the present invention, in which one separation claw is provided.
Figure 22:
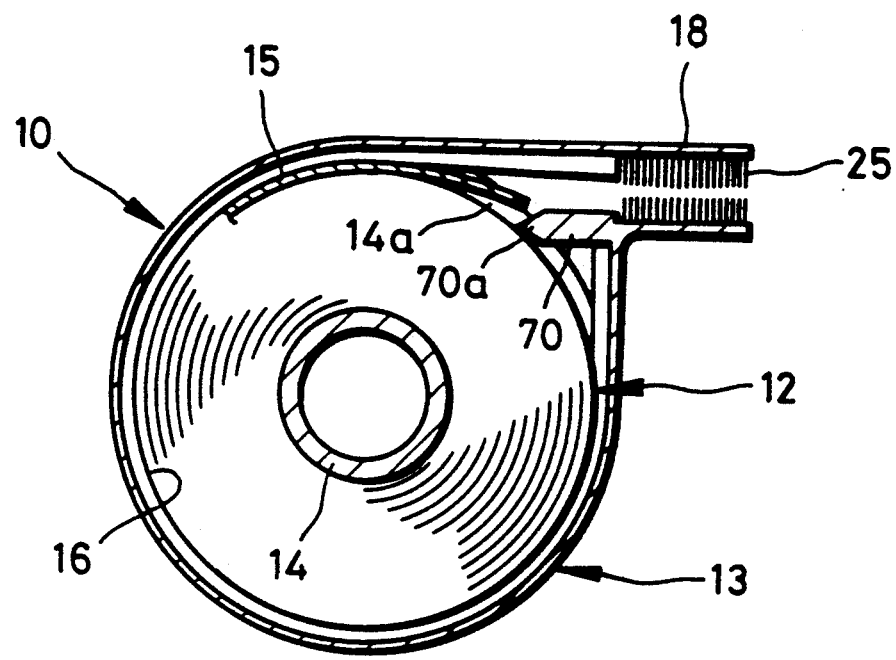
FIG. 22 is a sectional view showing the inner construction of the film cassette shown in FIG. 21.
Figure 23:
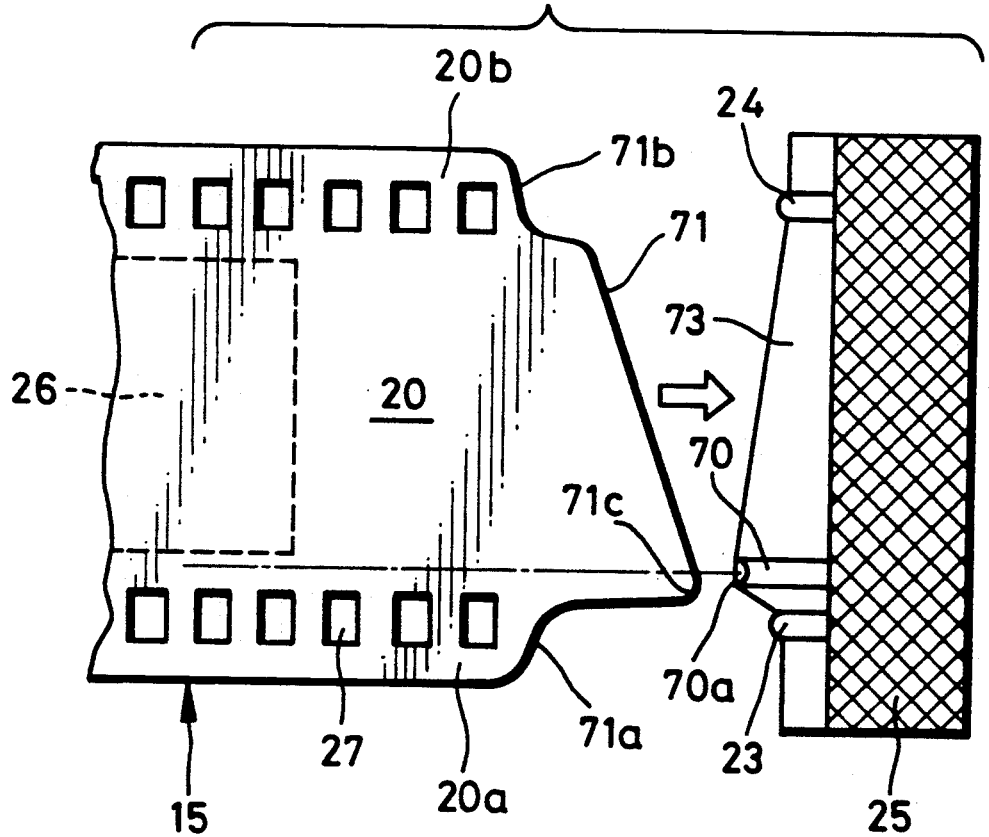
FIG. 23 is an explanatory view showing the relation between the separation claw and the film leader.

When a film cassette as shown in FIG. 16 is used if the width of the film leader 20 is made smaller, as shown in FIGS. 17 through 19, both side edges of the film leader 20 receive no pressure from the flanges 54a and 54b. Owing to the foregoing arrangement, the film leader 20 tends to become straight because of its own resiliency, and a gap is formed between the second layer and the leader 20, so that it becomes possible to separate the film leader 20 from the roll of film 12 with high reliability. Naturally, the aforementioned improvement of separation claws and the sticking prevention structure of the film leader may be employed together.

Figure 20:
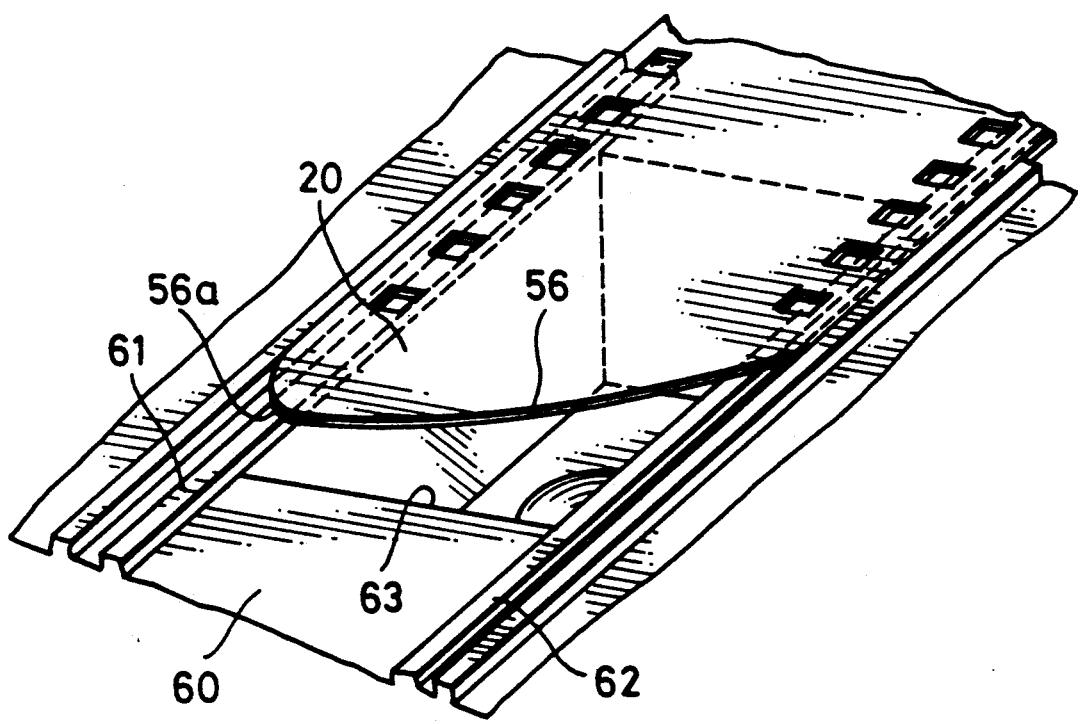
FIG. 20 is a perspective view showing the relation between the film leader and the guide rail of a camera.

In the embodiment shown in FIG. 17, a film leader end 56 is formed to have an inclined curve. In this film leader end 56, the most projected portion 56a, as shown in FIG. 20, is passed over an inner guide rail 61 of an aperture frame 60 of a camera. This serves to prevent a misfeed caused by the most projected portion 56a entering into an exposure aperture 63.

In the embodiment shown in FIG. 18, both side portions 57a, 57b of a film leader end 57 are projected like horns. Since these two horn portions climb over both of the inner guide rails 61, 62, the film leader end 57 can be prevented from falling into the exposure aperture 63 with high reliability. In the embodiment shown in FIG. 19, both sides of the film leader end 58 are cut off. Also this film leader end 58 must be cut in order not to fall into the exposure aperture 63.

When a couple of separation claws are provided, it may happen that only one of the separation claws separates the film leader. In that case, the film leader is twisted and clogs the film passage, thereby causing the film to jam. FIGS. 21 through 24 depict an embodiment in which one separation claw is provided. In this embodiment, as in the embodiment shown in FIGS. 1-3, a pair of ridges are disposed within the cassette shell in order to prevent the roll of film from being loosened. Therefore, members similar to those shown in FIGS. 1-3 are denoted by like reference numerals.

A guide projection 70 is provided on the cassette shell 13 at a position away from the picture frame 26, for example at a position beside the ridge 16, and a separation claw 70a is formed on the tip of the guide projection 70. In order to make a portion 71c of the entire film leader end 71 facing the separation claw 70a reach the separation claw 70a first, the film leader end 71 is cut diagonally from the left side portion 20a toward the right side portion 20b in FIG. 23 especially. Also, cuts 71a and 71b are formed in the left and right sides of the film leader end 71, so that the film leader end 71 will not be stuck to the roll of film 12. That is, since these cut portions 71a and 71b are not urged by the ridges 16 and 17, the film leader end 71 is loosened to a degree from the roll of film 12 owing to the film's own resiliency. Owing to the foregoing, the separation claw 70a can scoop up the film leader end 71 surely and feed it to the film passage mouth.

Operation of the above embodiments now will be described briefly. When the spool 14 is rotated in the unwinding direction, the roll of film 12 is rotated together with the spool 14. The film leader end 71 is scooped up at the most projected portion 71c thereof and climbs over the guide projection 70. When the spool 14 is further rotated, the film leader end 71 gradually climbs over the guide plate 73 from the cut 71a toward the other cut 71b. When the spool 14 keeps rotating, the film leader 20 is slid over the guide projections 23, 24, and 70 and is advanced toward the film passage mouth. Since the guide plate 73 is lower than the guide projections 23, 24, and 70, the guide plate 73 does not contact the film 15 after the film leader 20 has been separated and therefore, it does not reach the film 15, and so the film 15 is not damaged.

Figure 24:
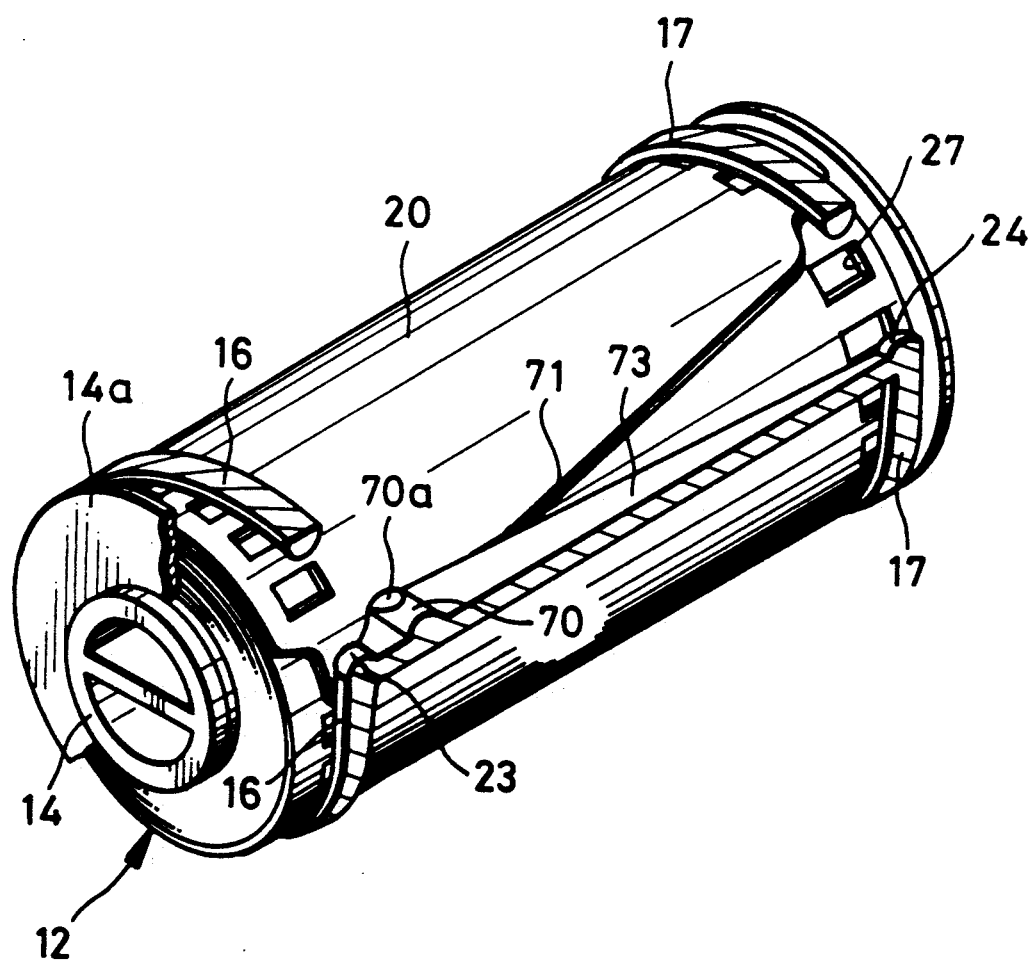
FIG. 24 is a view similar to FIG. 21 showing a state where the film leader end exceeds the separation claw.
Figure 25:
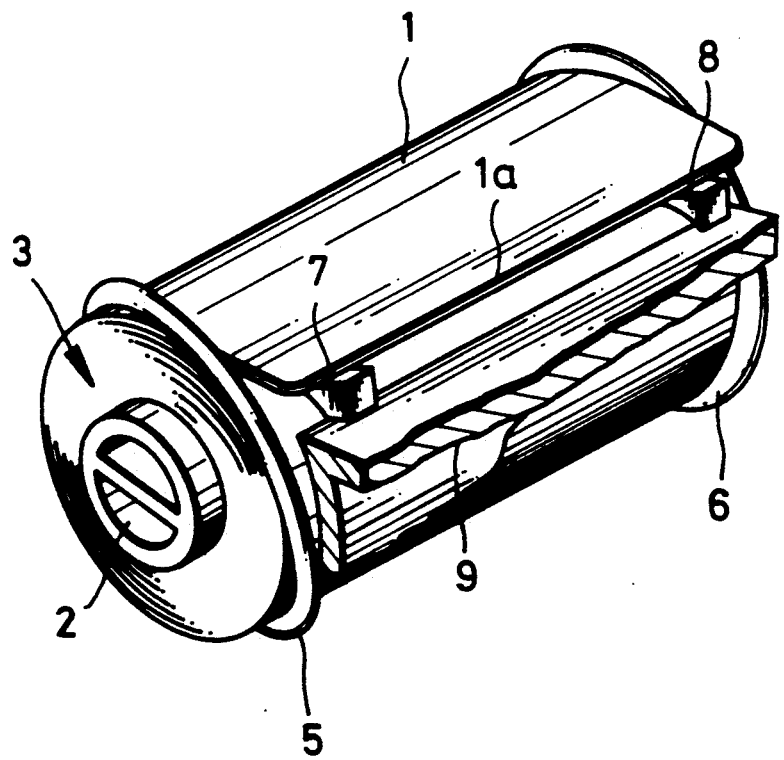
FIG. 25 is a perspective view showing an important portion of a conventional film cassette.

On the other hand, in the case of the state shown in FIG. 24, since the projected portion 71c passes the separation claw 70a, the left portion 20a of the film leader 20 is urged by the separation claw 70a. As a result, the film leader 20 stays curled. Accordingly, even if the roll of film 12 is twisted slightly, the left portion 20a of the film leader 20 does not come free and climb over the guide projection 24. When the spool 14 is rotated from the foregoing state, the roll of film 12 is rotated together with the spool 14, and the film leader 20 is separated from the roll of film 12 by the aforementioned operation so as to be advanced outside the film passage mouth.

The film leader end 70 need not necessarily be cut diagonally. For example, it may be cut into a linear-shape perpendicular to the advancing direction of the film, or only a portion corresponding to the separation claw 70a may be protruded in a trapezoid-shape.

The present invention can be utilized not only in the self-advancing film cassette having a mechanism for preventing a roll of film from being loosened, but also in a self-advancing film cassette described in U.S. Pat. No. 4,834,306, U.S. Pat. No. 4,846,418, etc.

While the invention has been described in detail above with reference to a preferred embodiment, various modifications within the scope and spirit of the invention will be apparent to people of working skill in this technological field. Thus, the invention should be considered as limited only by the scope of the appended claims.

What is claimed is:

1. A self-advancing film cassette consisting essentially of:
   a spool;
   a film roll formed of a photographic film wound on said spool;
   a cassette shell, including a film passage mouth, for containing said spool, said cassette shell further including loosening prevention mans for controlling advancement of a leader of said photographic film from said film passage mouth, said loosening prevention means preventing said film roll from being loosened when said spool is rotated in the unwinding direction of the film roll;

a single separation claw, disposed outside an area of said photographic film where an exposure image is formed, said separation claw protruding from an inner wall of said cassette shell toward said film roll so as to prevent jamming of said film leader against said loosening prevention means, wherein said film leader has a portion that projects so as to confront said separation claw and a groove formed in a base portion of said separation claw so as to provide a springy characteristic to said separation claw, such that said separation claw is biased towards said film roll.

2. A self-advancing film cassette as claimed in claim 1, wherein said film leader has a more rigid portion formed by embossing at a leading end thereof to prevent said film leader from being stuck to said film roll.

3. A self-advancing film cassette comprising:
a spool;
a film roll formed of a photographic film wound on said spool;
a cassette shell, including a film passage mouth having an extension, for containing said spool, said cassette shell further including loosening prevention means for controlling advancement of a leader of said photographic film from said film passage mouth, said loosening prevention means preventing said film roll from being loosened when said spool is rotated in the unwinding direction of the film roll, said loosening prevention means comprising a pair of ring-like ridges, said ridges being formed no the inner side of said cassette shell so that said ridges are disposed outside an area of said photographic film where an exposure image is formed, wherein said ridges are disposed in such a manner as to face perforations formed in both side edges of said photographic film; and a single separation claw, disposed within said cassette shell, for separating said film leader from said film roll, wherein a tip of said separation claw is positioned to contact a front of said film leader end at a point within ⅓ to ⅔ of a film thickness above a bottom surface of said film leader when measured from a bottom surface of said photographic film.

4. A self-advancing film cassette as claimed in claim 3, wherein said separation claw is disposed beside said ridges and projects in such a manner as to be more proximate to said film roll than to said ridges.

5. A self-advancing film cassette as claimed in claim 3, wherein said separation claw is formed integrally with said ridges.

6. A self-advancing film cassette as claimed n claim 5, wherein a width of said separation claw is larger than that of said perforations.

7. A self-advancing film cassette as claimed in claim 6, wherein a groove is formed in a base portion of said separation claw so as to provide a springy characteristic to said separation claw, such that said separation claw is biased toward said film roll.

* * * * *